US012040838B2

(12) United States Patent
Kim et al.

(10) Patent No.: US 12,040,838 B2
(45) Date of Patent: Jul. 16, 2024

(54) MITIGATION OF ANOMALY LOSS IN AN OPTICAL TRANSMISSION SYSTEM

(71) Applicant: FUJITSU LIMITED, Kawasaki (JP)

(72) Inventors: Inwoong Kim, Allen, TX (US); Olga I. Vassilieva, Plano, TX (US); Kyousuke Sone, Kawasaki (JP); Shoichiro Oda, Kawasaki (JP); Paparao Palacharla, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 27 days.

(21) Appl. No.: 17/943,028

(22) Filed: Sep. 12, 2022

(65) Prior Publication Data

US 2024/0089007 A1 Mar. 14, 2024

(51) Int. Cl.
*H04B 10/564* (2013.01)

(52) U.S. Cl.
CPC .................................. *H04B 10/564* (2013.01)

(58) Field of Classification Search
CPC .................................................... H04B 10/564
USPC .......................................................... 398/160
See application file for complete search history.

(56) References Cited

U.S. PATENT DOCUMENTS 6,064,501 A * 5/2000 Roberts ............. H04B 10/2912 359/341.44
6,885,093 B2 4/2005 Lo
7,095,912 B1 * 8/2006 Frigo .................. G02B 6/2726 385/11
7,456,687 B2 * 11/2008 Seino .................... H03F 1/0288 330/124 R
10,530,313 B2 * 1/2020 Lee ....................... H03F 1/0288
11,742,947 B1 * 8/2023 Kim .................. H04B 10/0775 398/26
2006/0023754 A1 * 2/2006 Sridhar ........... H04B 10/25133 370/535
2006/0087723 A1 * 4/2006 Takeyama ........... H04B 10/296 359/337
2008/0265132 A1 * 10/2008 Ishikawa .................. G01J 1/32 250/206

(Continued)

FOREIGN PATENT DOCUMENTS

CN 106170933 B * 4/2019 ........... G02B 6/4427

OTHER PUBLICATIONS

Abdelli et al; Machine Learning-based Anomaly Detection in Optical Fiber Monitoring ;2022; ADVA Optical Networking; pp. 1-11. (Year: 2022).*

(Continued)

*Primary Examiner* — Amritbir K Sandhu
(74) *Attorney, Agent, or Firm* — Maschoff Brennan

(57) ABSTRACT

In an example, a method may include obtaining anomaly characteristics associated with an anomaly in a transmission medium in an optical transmission system. The anomaly may cause a degradation in one or more signal characteristics of an optical signal traversing the transmission medium. Based on the anomaly characteristics, the method may also include adjusting a first output power of a first optical amplifier that may be disposed at an input end of the transmission medium. Alternatively, or additionally, based on the anomaly characteristics, the method may also include adjusting a second output power of a second optical amplifier that may be disposed at an output end of the transmission medium.

20 Claims, 4 Drawing Sheets

(56) References Cited

U.S. PATENT DOCUMENTS

| | | | | |
|---|---|---|---|---|
| 2009/0135408 | A1 * | 5/2009 | Brodsky | G01M 11/336 356/73.1 |
| 2009/0214226 | A1 * | 8/2009 | Mizuguchi | H04B 10/677 398/202 |
| 2012/0013975 | A1 * | 1/2012 | Onaka | H01S 3/13013 359/334 |
| 2016/0308611 | A1 * | 10/2016 | Oda | H04J 14/06 |
| 2017/0310391 | A1 * | 10/2017 | Oda | H04B 10/0795 |
| 2018/0062738 | A1 * | 3/2018 | Webb | H04B 10/071 |
| 2018/0145747 | A1 * | 5/2018 | Oda | H04B 10/07953 |
| 2021/0226408 | A1 * | 7/2021 | Boertjes | H04B 10/0797 |
| 2022/0329033 | A1 * | 10/2022 | Demars | H01S 3/1001 |

OTHER PUBLICATIONS

Abdelli et al; Machine-learning-based anomaly detection in optical fiber monitoring; May 2022; Journal of Optical communication and Networking, vol. 14, No. 5; pp. 1-11. (Year: 2022).*

* cited by examiner

Second Optical Amplifier 120
Receiver 125
Anomaly Detection 130
Transmission Medium 115
First Optical Amplifier 110
Transmitter 105
100
102

MITIGATION OF ANOMALY LOSS IN AN OPTICAL TRANSMISSION SYSTEM

FIELD

The embodiments discussed in the present disclosure are related to mitigation of anomaly loss in an optical transmission system.

BACKGROUND

Transmitting data between at least two remote points may be accomplished through various transmission mediums, which may include optical networks. In an optical network, data is conveyed in the form of optical signals through optical fibers or other optical media. The optical networks may include various components that may be used in the transmission of optical signals, such as optical amplifiers. Further, an optical amplifier may be configured to pump an optical signal such that the optical signal may be amplified for propagation through the optical network.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining anomaly characteristics associated with an anomaly in a transmission medium in an optical transmission system. The anomaly may cause a degradation in one or more signal characteristics of an optical signal traversing the transmission medium. Based on the anomaly characteristics, the method may also include adjusting a first output power of a first optical amplifier that may be disposed at an input end of the transmission medium. Alternatively, or additionally, based on the anomaly characteristics, the method may also include adjusting a second output power of a second optical amplifier that may be disposed at an output end of the transmission medium.

The object and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
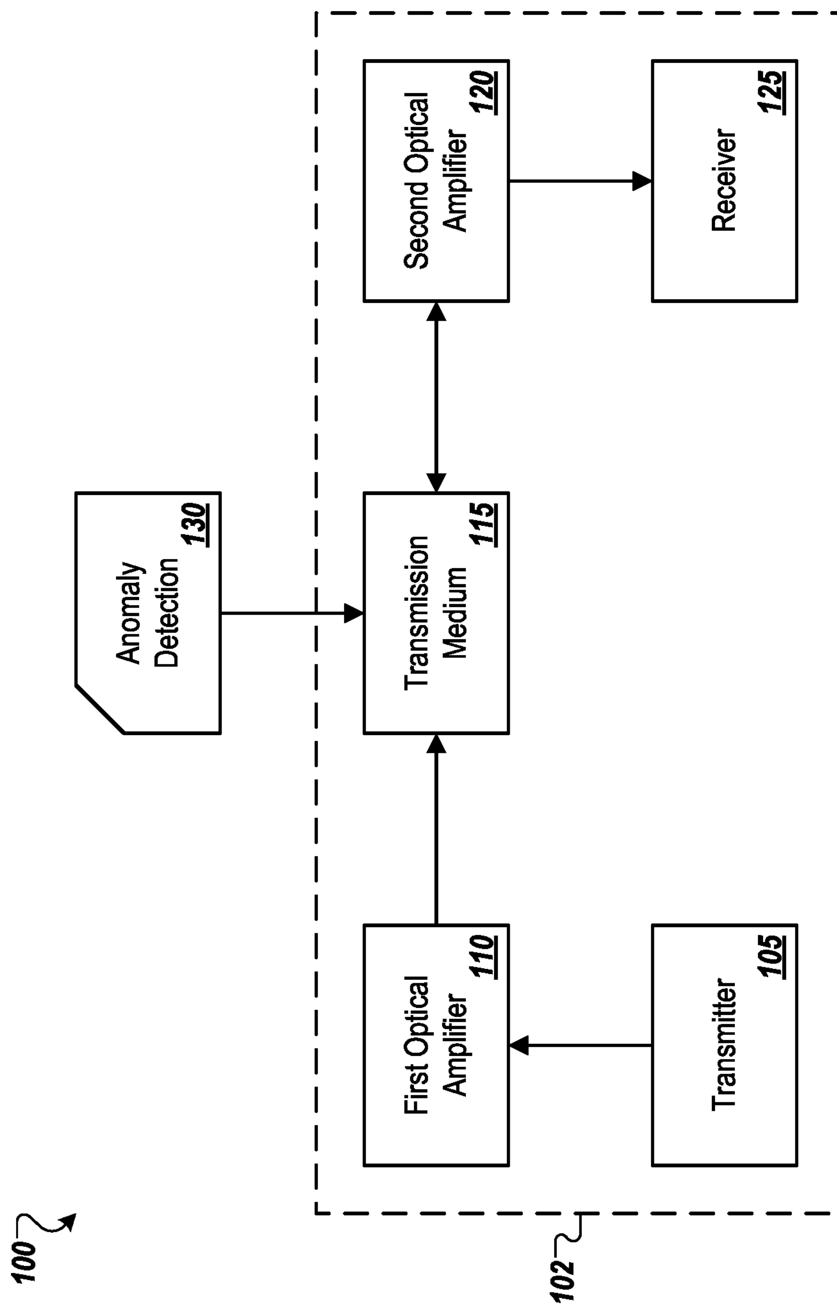
FIG. 1 is a block diagram of an example environment configured to mitigate losses due to an anomaly in an optical transmission system.

Optical networks may be configured to transmit data via optical signals that may be carried by optical fibers. In some circumstances, anomalies in the optical fibers may cause a degradation of the optical signals within the optical fibers, which may affect the transmitted data in the optical network. For example, a micro-bend in the optical fibers may cause a degradation of the optical signals which may affect the integrity of data carried by the optical signals. In some circumstances, the degradation of the optical signals may be represented by changes (e.g., losses) in one or more signal characteristics of the optical signals as determined at an output end of the optical fibers. The amount of degradation of the optical signals caused by an anomaly may vary based on a location of the anomaly in the optical fibers. For example, an anomaly located near an input end of optical fibers may cause a first amount of degradation in received signal characteristics and a similar anomaly located near an output end of the optical fibers may cause a second amount of degradation in the received signal characteristics. In instances in which an optical network fails to mitigate losses associated with anomalies located therein, the degradation in the optical signals may affect the amount of communicated data in the optical network, such that a transmission rate associated with data in the optical signal may decrease and/or an error rate associated with received data from the optical signals may increase. In some circumstances, the degradation of the optical signals may be observed by changes in the received signal characteristics at an output end of the optical fibers. Further, the signal characteristics may be measured at the output end of the optical fibers to determine an amount of degradation caused by the anomaly in the optical fibers.

In instances in which the anomaly is attributed to deformations in the optical fiber (e.g., micro-bending of the optical fiber and/or other physical changes to the optical fiber), the degradation due to the anomaly may be reduced or removed by repairing the deformations in the optical fiber. For example, a bent optical fiber may be straightened or replaced, which may partially or fully remove the anomaly in the optical fiber. However, in some circumstances, repairing an anomaly in optical fibers may be difficult due to a location of the optical fiber (e.g., buried in the ground and/or under another object) and/or may cause an interruption to the transmitted data.

According to one or more embodiments of the present disclosure, an optical network may be configured to determine a presence of an anomaly and mitigate losses introduced to the optical network by the anomaly. Anomaly characteristics may describe the anomaly and may include an anomaly location and an anomaly loss within the optical network. In response to the anomaly, a first output power of a first optical amplifier and/or a second output power of a second optical amplifier in the optical network may be adjusted. Adjusting the output powers of the first optical amplifier and/or the second optical amplifier may mitigate losses in an optical signal that may be introduced by the anomaly. In some embodiments, the amount of adjustment made to the first output power and/or the second output power may be based on the anomaly characteristics, such as the anomaly location. In these or other embodiments, an optical network may be configured to mitigate losses associated with an anomaly without interrupting the transmitted data and/or without physical repairs to the optical network. Further, the optical network may be configured to mitigate subsequent losses associated with subsequent anomalies that may be introduced to the optical network. For example, following mitigation for losses due to a first anomaly and an introduction of a second anomaly, the optical network may make a second adjustment to the first output power of the first optical amplifier and/or the second output power of the second optical amplifier, which may mitigate losses associated with the first anomaly and the second anomaly.

Further, some large optical networks that may be configured to cover large distances may include two or more optical spans that may be joined together. For example, a first optical span having a first optical amplifier disposed at a first input end of a first optical fiber and a second optical amplifier disposed at a first output end of the first optical fiber may be joined with a second optical span having a third optical amplifier disposed at a second input end of a second optical fiber and a fourth optical amplifier disposed at a second output end of the second optical fiber. The first optical span joined with the second optical span may act as a continuous optical fiber providing a path for an optical signal through an optical network. In these and other instances, losses associated with an anomaly in the first optical span may be mitigated without making changes in the second optical span.

Embodiments of the present disclosure will be explained with reference to the accompanying drawings.

FIG. 1 is a block diagram of an environment 100 configured to mitigate losses due to an anomaly in an optical transmission system 102, in accordance with at least one embodiment of the present disclosure. The optical transmission system 102 may include a transmitter 105, a first optical amplifier 110, a transmission medium 115, a second optical amplifier 120, and a receiver 125.

In general, the optical transmission system 102 may be configured to transmit data from a first system or device at a first location to at least a second system or device at a second location via the transmission medium 115, as described herein. The optical transmission system 102 may be configured to detect anomalies or disturbances in at least the transmission medium 115 which may affect an optical signal traversing through the transmission medium 115. Alternatively, or additionally, the optical transmission system 102 may be configured to adjust a pumping power corresponding to one or more optical amplifiers which may adjust a respective output power and/or pumping power of the one or more optical amplifiers, such as the first optical amplifier 110 and/or the second optical amplifier 120, in response to an anomaly in the transmission medium 115.

In some embodiments, the transmitter 105 may be configured to encode data into an optical signal. The optical signal may be transmitted to the receiver 125 through the transmission medium 115. In some embodiments, data encoded and/or transmitted by the transmitter 105 may include multiple wavelengths associated with the data. For example, an optical signal may include a first portion of the data encoded having a first wavelength, a second portion of the data encoded having a second wavelength, and so forth.

Alternatively, or additionally, the optical transmission system 102 may include a wavelength-division multiplexing (WDM) system such that one or more transmitters 105 and/or one or more receivers 125 may be included in the optical transmission system 102. In a WDM system, a wavelength selective switch (WSS, not illustrated in FIG.) may be configured to adjust an output power associated with each optical signal and associated wavelength(s) generated by each transmitter 105. For example, a first transmitter may generate a first optical signal having a first wavelength and first output power and a second transmitter may generate a second optical signal having a second wavelength and second output power and the WSS may be configured to adjust the first optical signal and/or the second optical signal according to the methods and functions described herein.

In some embodiments, the transmitter 105 may be configured to perform optical wavelength leveling operations. For example, the transmitter 105 may be configured to equalize a first power associated with a first wavelength of an optical signal with a second power associated with a second wavelength of the optical signal, such that the first wavelength and the second wavelength may be transmitted with substantially similar power levels. The present disclosure may refer to a single optical signal associated with transmitted data from a single transmitter, but it will be appreciated that any number of optical signals from any number of transmitters may include one or more wavelengths, each of which may be adjusted according to the methods described herein.

In some embodiments, the first optical amplifier 110 may be disposed at or near an input end of the transmission medium 115, such as adjacent to the transmitter 105 in the optical transmission system 102. In some embodiments, the second optical amplifier 120 may be disposed at or near an output end of the transmission medium 115, such as adjacent to the receiver 125 in the optical transmission system 102. In general, the first optical amplifier 110 and/or the second optical amplifier 120 may be configured to amplify an optical signal in the transmission medium 115. For example, the first optical amplifier 110 and/or the second optical amplifier 120 may be configured to amplify an optical signal. In these or other embodiments, the amount of amplifying, e.g., pumping, that may be introduced by the first optical amplifier 110 and/or the second optical amplifier 120 may be configurable, as described herein.

In some embodiments, the first optical amplifier 110 and/or the second optical amplifier 120 may include one or more various amplifiers having an associated amplification method. For example, either of the first optical amplifier 110 or the second optical amplifier 120 may include a doped fiber amplifier, such as an erbium doped fiber amplifier (EDFA), and/or a Raman amplifier. In some embodiments, an output power (e.g., a gain) of an EDFA may be adjusted by a pumping power associated with EDFAs and an output power of a Raman amplifier may be adjusted by a pumping power associated with Raman amplifiers.

In some embodiments, the first optical amplifier 110 may be a forward pumping amplifier (e.g., produce a forward output power) as the first optical amplifier 110 may amplify an optical signal in the direction of the receiver 125. In some embodiments, the second optical amplifier 120 may be a backward pumping amplifier (e.g., produce a backward output power) as the second optical amplifier 120 may amplify an optical signal in the direction of the transmitter 105. For example, a pump wave generated by the backward pumping amplifier may travel in a direction from the receiver 125 to the transmitter 105.

In some embodiments, the receiver 125 may be configured to receive and/or decode the optical signal such that the transmitted data may be received. In some embodiments, the receiver 125 and/or one or more components associated with the receiver 125 may be configured to determine signal characteristics associated with the received optical signal. For example, the receiver 125 may determine the signal characteristics associated with the optical signal received from the transmitter 105. In some embodiments, the signal characteristics may include at least one of a signal-to-noise ratio, an error vector magnitude, and/or a pre-forward-error correction coding bit error rate, all of which may be associated with the received optical signal.

In these or other embodiments, the signal characteristics associated with the optical signal may provide an indication of the power of the optical signal relative to power of the noise in the transmission medium 115. In some embodiments, the optical transmission system 102 may adjust the output power of the first optical amplifier 110 and/or the second optical amplifier 120 which may improve the signal characteristics associated with the received optical signal at the receiver 125.

In some embodiments, the transmission medium 115 may be an optical fiber. The optical fiber may include any medium suitable for optical transmissions, such as glass, fluorozirconate glass, fluoroaluminate glass, crystalline materials, and/or any other suitable medium for optical transmissions. In some embodiments, the transmission medium 115 may include a single mode fiber (SMF) which may be configured to carry a single mode of light. Alternatively, or additionally, the transmission medium 115 may include a multi-mode fiber which may be configured to carry multiple modes of light.

In these or other embodiments, the transmission medium 115 may include a linear fiber or a nonlinear fiber, where the linear fiber may exhibit a decrease in optical nonlinearities and where the nonlinear fiber may exhibit an increase in optical nonlinearities. As such, the transmission medium 115 may be a linear transmission medium or a nonlinear transmission medium. In some embodiments, the first optical amplifier 110 and/or the second optical amplifier 120 may include a different method of amplification based on the transmission medium 115. For example, in instances in which the transmission medium 115 is a nonlinear fiber, the first optical amplifier 110 may be a forward Raman amplifier, an EDFA, and/or a combination of a forward Raman amplifier and an EDFA, and the second optical amplifier 120 may be a backward Raman amplifier.

In some embodiments, the transmission medium 115 may be configured to traverse a relative long distance between the transmitter 105 and the receiver 125. For example, the transmission medium 115 may have a length of tens, hundreds, or thousands of kilometers. In some embodiments, the optical transmission system 102 may include multiple optical spans which may enable the optical transmission system 102 to extend the length thereof. Each optical span in the optical transmission system 102 may include one or more optical amplifiers, such as the first optical amplifier 110 and/or the second optical amplifier 120. Further, one optical span may be connected to a second optical span, such that multiple optical spans may be included in the optical transmission system 102.

As illustrated in FIG. 1 which may represent one optical span, an optical span may include the first optical amplifier 110 and the second optical amplifier 120 disposed at remote ends of the transmission medium 115. In instances in which an optical transmission system includes more than one optical span, additional optical amplifiers and/or transmission mediums may be included between the transmitter 105 and the receiver 125. For example, a third optical amplifier and a fourth optical amplifier may be coupled to remote ends of a second transmission medium, the third optical amplifier may be adjacent to the second optical amplifier 120 and the fourth optical amplifier may be adjacent to the receiver 125 such that the optical transmission system 102 may include two optical spans. In these or other embodiments, any number of optical amplifiers may be associated with an optical span in an optical transmission system.

In some embodiments, noise may be present in the transmission medium 115 which may degrade the signal characteristics associated with the optical signal received at the receiver 125. The noise in the transmission medium 115 may include amplified spontaneous emission (ASE) noise, nonlinear noise, and/or other sources of noise. In some embodiments, variations in the output power from the first optical amplifier 110 and/or the second optical amplifier 120 may increase or decrease the total amount of noise in the transmission medium 115 which may affect the signal characteristics of the optical signal traversing the transmission medium 115. Alternatively, or additionally, variations in the output power from the first optical amplifier 110 and/or the second optical amplifier 120 may increase or decrease an amount of a specific type of noise. For example, increasing the output power of the first optical amplifier 110 may decrease the amount of ASE noise in the transmission medium 115 and may increase the amount of nonlinear noise in the transmission medium 115. Thus, increasing the output power may not result in a decrease of the total amount of noise in the transmission medium 115.

In some embodiments, adjusting the output power of the first optical amplifier 110 and/or the second optical amplifier 120 may include adjusting a respective input power to the first optical amplifier 110 and/or the second optical amplifier 120, where the input power may include a pumping power. For example, in instances in which the first optical amplifier 110 is a doped fiber amplifier, increasing a pumping power (e.g., the input power) to the first optical amplifier 110 may cause an increase in the output power of the first optical amplifier 110. In another example, in instances in which the second optical amplifier 120 is a backward Raman amplifier, increasing a pumping power (e.g., the input power) to the second optical amplifier 120 may cause an increase in the output power of the second optical amplifier 120.

In general, variations to the output power of the first optical amplifier 110 may result in increases or decreases in the signal characteristics associated with a received optical signal (e.g., by the combined effects of the ASE noise and the nonlinear noise in the transmission medium 115). For example, a first output power by the first optical amplifier 110 may produce lower signal characteristics at the receiver 125 than a second output power by the first optical amplifier 110, where the first output power may be greater than or less than the second output power. In some embodiments, noise in the transmission medium 115 may be inherent to the transmission medium 115 and may be described as a transmission medium loss coefficient. For example, characteristics of materials included in the transmission medium 115, such as refractive characteristics, light dispersion, and the like, may introduce noise and/or losses (e.g., decreased signal characteristics in the received optical signal) into an optical signal traversing the transmission medium 115.

In some embodiments, one or more anomalies may be disposed in the transmission medium 115 which may cause a degradation to the signal characteristics associated with an optical signal traversing the transmission medium 115. In some embodiments, an anomaly may include deformities in the transmission medium 115 (e.g., a micro-bend of the optical fiber) and/or any other object or event that may affect performance of the optical transmission system 102 (e.g., a degradation in the signal characteristics of a received optical signal) that is not part of regular characteristics of the optical transmission system. In some embodiments, performing a physical repair to the transmission medium 115 of the optical transmission system 102 may be difficult, expensive, and/or not feasible. For example, the transmission medium 115 may be buried in the ground and/or under another object. Alternatively, or additionally, performing a repair for an anomaly in transmission medium 115 may interrupt service provided by the optical transmission system 102. For example, digging up the transmission medium 115 and splicing in a new portion of transmission medium may render the optical transmission system 102 inoperable for a period of time.

In some embodiments, the optical transmission system 102 may include a system or device configured to perform anomaly detection 130. Anomaly detection may include detecting an anomaly and obtaining anomaly characteristics associated with the detected anomaly in the transmission medium 115. In some embodiments, the anomaly characteristics may include at least an anomaly location (e.g., a location within the transmission medium 115, such as a distance determined relative to a location of the transmitter 105 and/or the receiver 125) and an anomaly loss amount, which may be described in decibels (dB). The anomaly detection 130 may be performed by a system that may be remote to, or integrated with, the optical transmission system 102. For example, a system or device configured to perform anomaly detection 130 may include an optical power monitor, an optical time domain reflectometer, a power profiling estimator, and the like. Examples of a system or device configured to perform anomaly detection 130 is found in U.S. Pat. No. 10,419,117 granted on Sep. 17, 2019, which is incorporated herein by reference in its entirety.

In some embodiments, an amount of loss in an optical signal (e.g., a degradation in the signal characteristics of the received optical signal) associated with an anomaly may vary based on the location of the anomaly within the transmission medium 115. For example, an anomaly in the transmission medium 115 located adjacent to the transmitter 105 may cause a first degradation in the signal characteristics of a first optical signal and the anomaly located adjacent to the receiver 125 may cause a second degradation in the signal characteristics of a second optical signal.

Alternatively, or additionally, different types of noises may experience a different effect from an anomaly based on the location of the anomaly in the transmission medium 115. For example, in some circumstances, nonlinear noise may cause a more prominent effect in an optical signal (e.g., may cause a greater change in the nonlinear interference noise of the received optical signal as most nonlinear noise interference may occur in an effective length portion of the transmission medium 115) in instances in which the anomaly location is adjacent to the receiver 125, such as outside of (or beyond) a threshold distance from the transmitter 105, as described herein. Alternatively, or additionally, the ASE noise may cause little to no effect in the optical signal based on the anomaly location being adjacent to the transmitter 105 within the transmission medium 115. In general, a degradation in the signal characteristics of a received optical signal may be greater in instances in which the anomaly location in the transmission medium 115 is nearer the receiver 125 than an anomaly nearer the transmitter 105 as degradations due to the ASE noise may remain substantially constant regardless of the anomaly location and degradations due to the nonlinear noise may be greater when the anomaly location is nearer the receiver 125 than when the anomaly location is nearer the transmitter 105 (e.g., the degradation to the signal characteristics of a received optical signal relative to the anomaly location may be approximately the same due to ASE noise regardless of location within the transmission medium 115 and may be greater due to nonlinear noise in anomalies nearer the receiver 125 than anomalies nearer the transmitter 105).

In some embodiments, the optical transmission system 102 may be configured to mitigate losses (or degradations) in the signal characteristics of an optical signal due to an anomaly in the transmission medium 115. The optical transmission system 102 may adjust the output power of the first optical amplifier 110 and/or the second optical amplifier 120 (e.g., the forward output power of the first optical amplifier 110 and/or the backward output power of the second optical amplifier 120) which may mitigate losses due to an anomaly in the transmission medium 115. For example, in instances in which an anomaly causes a degradation to signal characteristics of a received signal, the optical transmission system 102 may adjust the forward output power of the first optical amplifier 110 and the backward output power of the second optical amplifier 120 to mitigate a degradation in the signal characteristics of the optical signal due to the anomaly.

In some embodiments, the optical transmission system 102 may determine an adjustment to the forward output power of the first optical amplifier 110 to contribute to mitigating losses due to an anomaly. Further, in some embodiments, the forward output power of the first optical amplifier 110 may be adjusted by adjusting a forward input power, such as a gain associated with the first optical amplifier. In some embodiments, the amount of adjustment to the forward input power of the first optical amplifier 110 may be based on at least an anomaly loss amount, an anomaly location, and a factor associated with the transmission medium loss coefficient. For example, an adjustment to the forward input power may include increasing the forward input power and may be determined by multiplying a first value with a second value. The first value may be the anomaly loss amount, which may be expressed in decibels. The second value may be determined by multiplying a negative of the factor associated with the transmission medium loss coefficient with the anomaly location and taking an exponent of the result. The anomaly location may be expressed as a measure of distance, such as kilometers. In some embodiments, the factor associated with the transmission medium loss coefficient may be determined by experiment and/or simulation.

The anomaly loss amount may be a decrease in the signal characteristics of a received optical signal and the anomaly location may be a location in the transmission medium 115 measured from the input end of the transmission medium 115 (e.g., adjacent to the transmitter 105). For example, an adjustment to the forward input power (ΔFIP) may be determined by the equation:

$$\Delta FIP=L_a*e^{-C*D_a}$$

where $L_a$ is the anomaly loss amount, C is a factor associated with the transmission medium loss coefficient, and $D_a$ is the anomaly location.

Alternatively, or additionally, the optical transmission system 102 may determine an adjustment to the backward output power of the second optical amplifier 120 to contribute to mitigating losses due to an anomaly. In some embodiments, the amount of adjustment to the backward output power of the second optical amplifier 120 may be based at least on the anomaly loss amount, the anomaly location, and a factor associated with the transmission medium loss coefficient. For example, an adjustment to the backward output power may include increasing the backward output power and may be determined by multiplying a first value with a second value. The first value may be a negative of the anomaly loss amount, which may be expressed in decibels. The second value may be determined by multiplying a negative of the factor associated with the transmission medium loss coefficient with the anomaly location and taking an exponent of the result. The anomaly location may be expressed as a measure of distance, such as kilometers. For example, an adjustment to the backward Raman gain (ΔBRG) may be determined by the equation:

$$\Delta BRG=-1*L_a*e^{-c*D_a}$$

where $L_a$ is the anomaly loss amount, C' is a factor associated with the transmission medium loss coefficient, and $D_a$ is the anomaly location. In these or other embodiments, the output power associated with the second optical amplifier 120 may be based on the adjustment to the backward Raman gain (or the estimated adjustment to the backward Raman gain) where the backward output power may not be linearly proportional to the adjustment to the backward Raman gain.

In some embodiments, in instances in which an anomaly location is within a threshold distance from the transmitter 105, the optical transmission system 102 may adjust the forward output power of the first optical amplifier 110 and/or the backward output power of the second optical amplifier 120. In instances in which an anomaly location is further than a threshold distance from the transmitter 105, the optical transmission system 102 may adjust the backward output power of the second optical amplifier 120 and may not adjust the forward output power of the first optical amplifier 110.

In some embodiments, the threshold distance may be based on an effective transmission medium length of the transmission medium 115, such as instances in which the transmission medium 115 includes a nonlinear fiber. In some embodiments, the effective transmission medium length may be determined using a transmission medium length of the transmission medium 115 and the transmission medium loss coefficient of the transmission medium 115. For example, the effective transmission medium length may be determined by subtracting a determined value from the number one. The determined value may include a first value divided by a second value. The first value may be determined by multiplying a negative of the transmission medium with the transmission medium length of the transmission medium 115 and taking an exponent of the result. The second value may be the transmission medium loss coefficient. In some embodiments, the transmission medium length may be expressed as a measure of distance, such as kilometers. For example, the effective transmission medium length, $L_{eff}$, may be determined by the equation:

$$L_{eff}=(1-e^{-\alpha L})/\alpha$$

where $\alpha$ is the transmission medium loss coefficient of the transmission medium 115 and L is transmission medium length of the transmission medium 115. In some embodiments, the threshold distance may be equal to the effective transmission medium length as a greater portion of nonlinear noise in the transmission medium 115 may be experienced within the effective transmission medium length thereof compared to the portion of nonlinear noise beyond the effective transmission medium length. Alternatively, or additionally, the threshold distance may be a multiple of the effective transmission medium length, such as $0.5*L_{eff}$, $1.5*L_{eff}$, $2*L_{eff}$, $3*L_{eff}$, and/or other multiples of the effective transmission medium length, which may encompass a greater portion of nonlinear noise in the transmission medium 115 within the threshold distance.

In instances in which the optical transmission system 102 includes multiple optical spans, determinations associated with a forward output power of a first optical amplifier in a first optical span and a backward output power of a second optical amplifier in the first optical span may be used to mitigate degradations in the signal characteristics associated with an anomaly located in the first optical span. Further, other optical spans in the optical transmission system 102 which may not include an anomaly, may include a fixed forward output power and/or a fixed backward output power in the respective optical amplifiers.

For example, in instances in which an anomaly location is in a second optical span of an optical transmission system, the forward output power and/or the backward output power of associated optical amplifiers in the second optical span may be adjusted to mitigate degradations in signal characteristics of a received optical signal due to the anomaly. The forward output power and/or the backward output power of associated optical amplifiers in a first optical span may not be affected by the mitigation operations in the second optical span in response to the anomaly.

In some embodiments, the optical transmission system 102 may include a network controller (not illustrated), which may be in communication with each optical span in the optical transmission system 102. In some embodiments, the network controller may be configured to adjust the output power of one or more amplifiers in each of the optical spans in the optical transmission system 102. Alternatively, or additionally, the network controller may be configured to adjust an input power (e.g., a pumping power) associated with one or more amplifiers in each of the optical spans in the optical transmission system 102.

In an example, in instances in which an anomaly is located at the threshold distance or within the threshold distance from the transmitter 105, the forward output power of the first optical amplifier 110 may be adjusted to be increased which may mitigate at least some of the loss of the optical signal traversing the transmission medium 115. Alternatively, or additionally, the backward output power of the second optical amplifier 120 may or may not be adjusted when an anomaly is located near the input end of the transmission medium 115, including at or within the threshold distance.

In instances in which an anomaly is located at the threshold distance or within the threshold distance from the receiver 125 (e.g., nearer the output end of the transmission medium 115 and/or adjacent to the receiver 125), the backward output power of the second optical amplifier 120 may be adjusted to be increased which may mitigate at least some of the loss of the optical signal traversing the transmission medium 115. Alternatively, or additionally, the forward output power of the first optical amplifier 110 may or may not be adjusted when an anomaly is located near the output end of the transmission medium 115.

As such, in instances in which an anomaly is located in a middle portion of the transmission medium 115, the forward output power of the first optical amplifier 110 and/or the backward output power of the second optical amplifier 120 may be adjusted to mitigate at least some of the loss of the optical signal due to the anomaly. In some embodiments, the middle portion of the transmission medium 115 may include a portion of the transmission medium 115 located between the threshold distance from the transmitter 105 and the threshold distance from the receiver 125. In instances in which both the forward output power and the backward output power are adjusted in the optical transmission system 102, the forward output power may first be adjusted followed by an adjustment to the backward output power. For example, the forward output power of the first optical amplifier 110 may be adjusted which may cause an increase to the signal characteristics associated with an optical signal traversing the transmission medium 115. The signal characteristics may be measured following the adjustment to the forward output power, such as by the receiver 125, to verify an increase in the signal characteristics of the optical signal. In response to the signal characteristics increasing due to the adjustment to the forward output power, the backward output power may be adjusted which may cause a further increase to the signal characteristics associated with an optical signal traversing the transmission medium 115.

Modifications, additions, or omissions may be made to the optical transmission system 102 without departing from the scope of the present disclosure. For example, in some embodiments, the optical transmission system 102 may include additional optical amplifiers, one or more transmission mediums, one or more additional optical spans, and the like. Alternatively, or additionally, in some embodiments, the optical transmission system 102 may include any number of other components that may not be explicitly illustrated or described.

Figure 2:
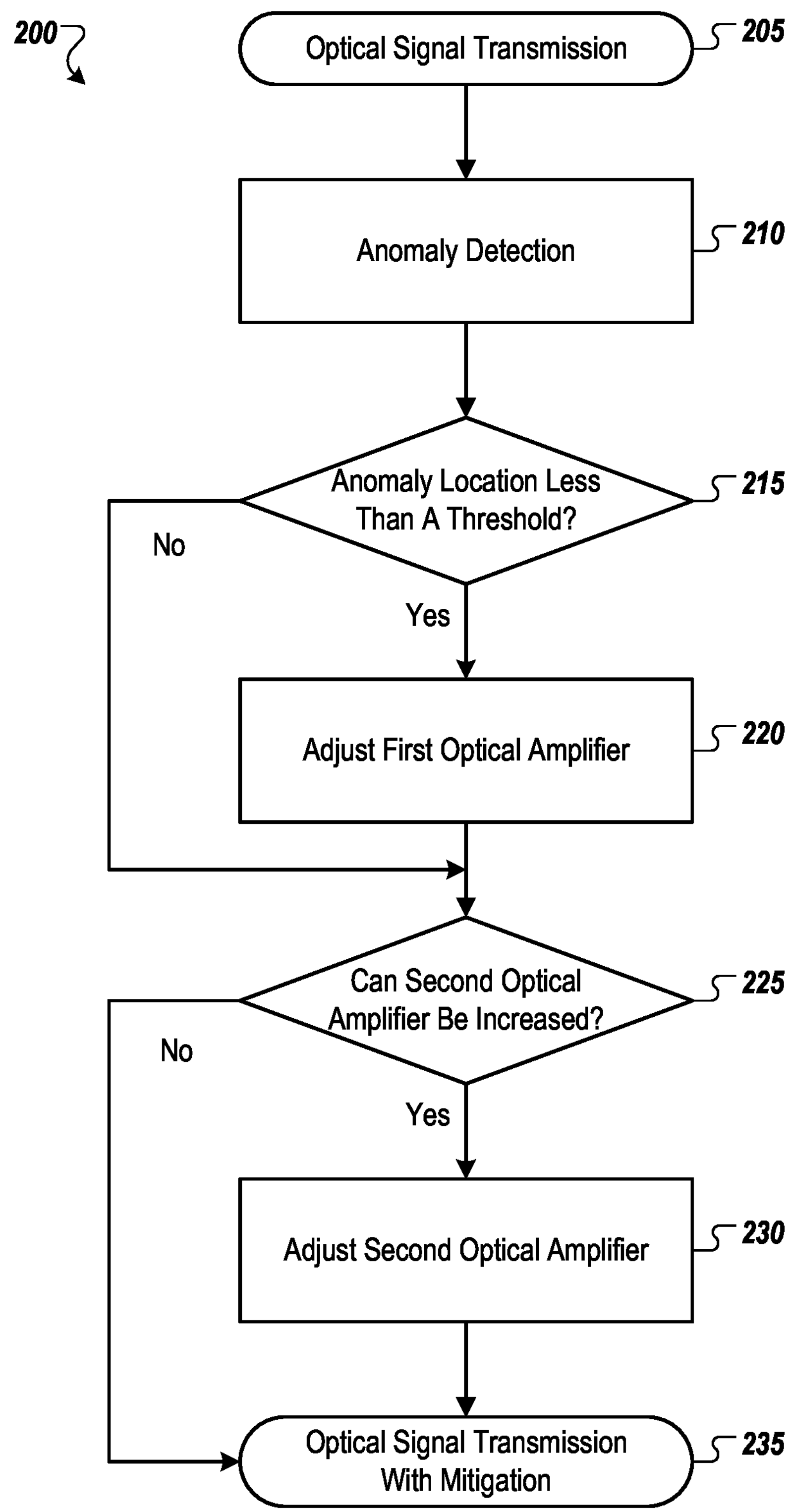
FIG. 2 is a flowchart of an example method of mitigation of anomaly loss in an optical transmission system.

FIG. 2 is a flowchart of an example method 200 of mitigation of anomaly loss in an optical transmission system, in accordance with at least one embodiment of the present disclosure. One or more operations of the method 200 may be performed, in some embodiments, by a device or system, such as the optical transmission system 102 of FIG. 1 one or more components of the optical transmission system 102, or another device, combination of devices, or system. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

In some embodiments, the method 200 may begin at block 205 where optical signals may be transmitted in an optical transmission system, such as the optical transmission system 102 of FIG. 1. The optical signals may be generated by a transmitter, traverse an optical medium, and be received by a receiver, such as the transmitter 105, the transmission medium 115, and the receiver 125 of FIG. 1, respectively. In some embodiments, the optical signals may be amplified by one or more optical amplifiers, such as the first optical amplifier 110 and/or the second optical amplifier 120 of FIG. 1. At least one optical amplifier (e.g., a first optical amplifier) may be disposed at an input end of the transmission medium (e.g., adjacent to the transmitter) and may be configured to produce a forward output power. Alternatively, or additionally, at least one optical amplifier (e.g., a second optical amplifier) may be disposed at an output end of the transmission medium (e.g., adjacent to the receiver) and may be configured to produce a backward output power. In these or other embodiments, the optical signals may convey encoded data from one system to another system via the transmission medium. In some embodiments, the transmission medium may introduce losses to a traversing optical signal which may be characterized by a transmission medium loss coefficient.

At block 210, an anomaly in the transmission medium may be detected. In some embodiments, the anomaly may be caused by a micro-bend in the transmission medium, such as by physical contact to the transmission medium during service to a nearby transmission medium. Alternatively, or additionally, the anomaly may be any unexpected damage or event associated with a degradation of signal characteristics determined by the receiver of the optical signal. The degradation of the signal characteristics associated with the optical signal due to the anomaly may be in addition to losses attributable to the transmission medium loss coefficient.

In some embodiments, detecting the anomaly may include determining anomaly characteristics associated with the anomaly, which may include an anomaly location and an anomaly loss amount. The anomaly location may be represented by a distance measured from the input end of the transmission medium to the anomaly. The anomaly loss amount may be represented by a decrease in the signal characteristics of the optical signal as received by the receiver.

At block 215, a system and/or device performing the method 200 may determine whether the anomaly location is less than a threshold distance, such as measured from the transmitter of the optical transmission system. In instances in which the anomaly location is less than the threshold distance, the method 200 may continue with block 220. In instances in which the anomaly location is not less than the threshold distance, the method 200 may continue with block 225.

At block 220, the first optical amplifier may be adjusted, which may include an adjustment to the forward output power of the first optical amplifier. The adjustment to the forward output power may be directed to mitigating a degradation of the signal characteristics of the optical signal due to an anomaly in the transmission medium. In some embodiments, the adjustment to the forward output power may be based on the anomaly loss amount, the anomaly location, and the transmission medium loss coefficient associated with the transmission medium, as described herein. In some embodiments, adjustments to the forward output power may improve the signal characteristics of the optical signal at the receiver compared to the signal characteristics of the optical signal with the anomaly present in the transmission medium.

At block 225, a system and/or device performing the method 200 may determine whether the backward output power of the second optical amplifier may be increased. In instances in which the backward output power of the second optical amplifier is below a threshold output power, the backward output power of the second optical amplifier may be increased. In some embodiments, increasing the backward output power may be limited by associated hardware (e.g., the optical amplifier, the transmission medium, etc.) and/or pumping limits of the optical amplifier. In instances in which an increase in the backward output power may cause damage to the associated hardware and/or the optical amplifier is at or near the associated pumping limit, the backward output power may not be increased. In instances in which the backward output power of the second optical amplifier may be increased, the method 200 may continue with block 230. In instances in which the backward output power of the second optical amplifier may not be increased, the method 200 may continue with block 235.

At block 230, the second optical amplifier may be adjusted, which may include an adjustment to the backward output power of the second optical amplifier. The adjustment to the backward output power may be directed to mitigating a degradation of the signal characteristics of the optical signal due to an anomaly in the transmission medium. In some embodiments, the adjustment to the backward output power may be based on the anomaly loss amount, the anomaly location, and the transmission medium loss coefficient associated with the transmission medium, as described herein. In some embodiments, adjustments to the backward output power may improve the signal characteristics of the optical signal at the receiver compared to the signal characteristics of the optical signal with the anomaly present in the transmission medium.

At block 235, the optical signals in the optical transmission system may continue to be transmitted having had adjustments made to the forward output power of the first optical amplifier and/or the backward output power of the second optical amplifier. In some embodiments, the adjustments to the forward output power and/or the backward output power may mitigate degradations to the signal characteristics of an optical signal due to the anomaly in the transmission medium. In some embodiments, the adjusted optical signal (e.g., adjusted by adjustments to the forward output power and/or the backward output power) may include signal characteristics at the receiver that may be the same or similar as signal characteristics associated with an optical signal traversing the transmission medium without an anomaly.

Figure 3:
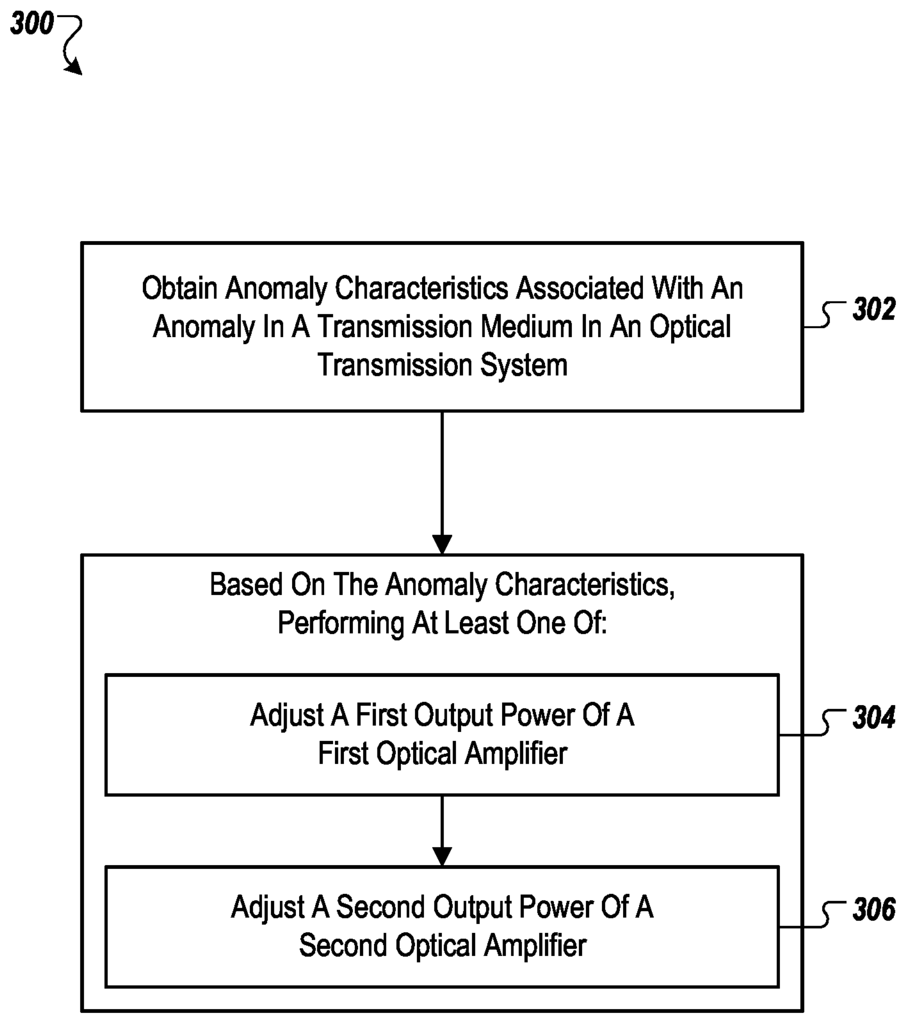
FIG. 3 is a flowchart of another example method of mitigation of anomaly loss in an optical transmission system.

FIG. 3 is a flowchart of an example method 300 of mitigation of anomaly loss in an optical transmission system, in accordance with at least one embodiment of the present disclosure. One or more operations of the method 300 may be performed, in some embodiments, by a device or system, or combination of devices or systems. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 302 where anomaly characteristics associated with an anomaly in a transmission medium may be obtained. The transmission medium may be included in an optical transmission system. In some embodiments, the anomaly may cause a degradation in signal characteristics of an optical signal traversing the transmission medium. In some embodiments, the anomaly characteristics may include an anomaly location within the transmission medium and/or an anomaly loss amount.

In some embodiments, one or both of block 304 and block 306 may be performed based on the anomaly characteristics obtained in block 302. For example, a threshold may be associated with one or more of the anomaly characteristics, as described herein. In response to the threshold, one or both of block 304 and block 306 may be performed, as described herein.

At block 304, a first output power of a first optical amplifier may be adjusted. In some embodiments, adjusting the first output power may be based on the anomaly loss amount, the anomaly location, and a factor associated with a transmission medium loss coefficient associated with the transmission medium. In some embodiments, adjusting the first output power may include adjusting a first pumping power associated with the first optical amplifier. Alternatively, or additionally, adjusting the first output power may include adjusting a first input power associated with a first wavelength of the optical signal and adjusting a second input power associated with a second wavelength of the optical signal.

At block 306, a second output power of a second optical amplifier may be adjusted. In some embodiments, adjusting the second output power may be based on the anomaly loss amount, the anomaly location, and a factor associated with the transmission medium loss coefficient associated with the transmission medium. In some embodiments, adjusting the second output power may include adjusting a second pumping power associated with the second optical amplifier. In some embodiments, the second optical amplifier may be a Raman amplifier.

In some embodiments, a threshold distance may be obtained. The threshold distance may be based on an effective transmission medium length of the transmission medium, such as instances in which the transmission medium includes a nonlinear fiber. The effective transmission medium length may be determined using a transmission medium length of the transmission medium and a transmission medium loss coefficient of the transmission medium.

In instances in which the anomaly location is less than the threshold distance from the input end of the transmission medium, the operations described relative to block 306 may be performed after the operations described relative to block 304. Alternatively, in instances in which the anomaly location is greater than the threshold distance from the input end of the transmission medium, the forward output power may not be adjusted, and the backward output power may be adjusted.

Modifications, additions, or omissions may be made to the method 300 without departing from the scope of the present disclosure. For example, the optical transmission system may include multiple optical spans. In instances in which the optical transmission system includes multiple optical spans and in response to the anomaly characteristics indicating an anomaly location is in a first optical span of the multiple optical spans, only the first output power of the first optical amplifier and/or the second output power of the second optical amplifier in the first optical span may be adjusted. Further, an adjustment to output powers of optical amplifiers in other optical spans of the multiple optical spans may not occur in response to the anomaly location being in the first optical span of the multiple optical spans. Alternatively, or additionally, the method 300 may include any number of other components that may not be explicitly illustrated or described.

Figure 4:
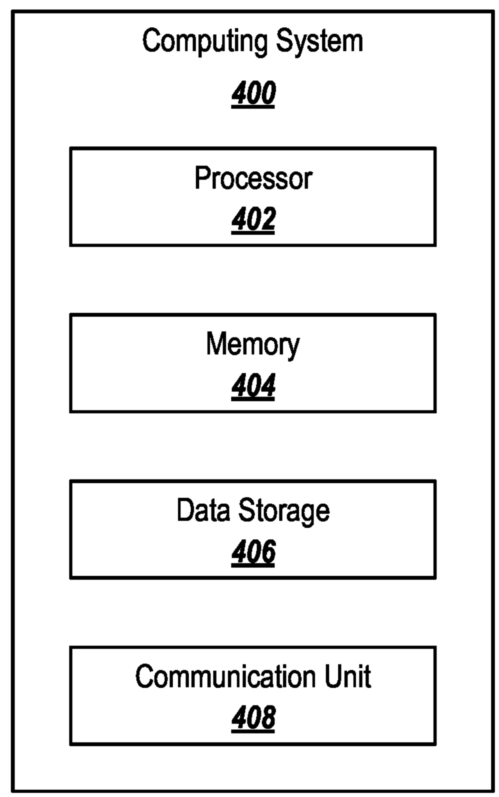
FIG. 4 illustrates an example computing system that may be used for mitigation of anomaly loss in an optical transmission system.

FIG. 4 illustrates an example computing system 400 that may be used for mitigation of anomaly loss in an optical transmission system, in accordance with at least one embodiment of the present disclosure. The computing system 400 may be configured to implement or direct one or more operations associated with mitigation of anomaly loss in an optical transmission system, which may include operation of the optical transmission system 102 of FIG. 1, performance of the method 200 of FIG. 2, and/or performance of the method 300 of FIG. 3. The computing system 400 may include a processor 402, memory 404, data storage 406, and a communication unit 408, which all may be communicatively coupled. In some embodiments, the computing system 400 may be part of any of the systems or devices described in this disclosure.

The processor 402 may include any computing entity, or processing device including various computer hardware or software modules and may be configured to execute instructions stored on any applicable computer-readable storage media. For example, the processor 402 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 402 may include any number of processors distributed across any number of networks or physical locations that are configured to perform individually or collectively any number of operations described herein.

In some embodiments, the processor 402 may be configured to interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into memory 404, the processor 402 may execute the program instructions.

For example, in some embodiments, the processor 402 may be configured to interpret and/or execute program instructions and/or process data stored in the memory 404, the data storage 406, or the memory 404 and the data storage 406. The program instruction and/or data may be related to multi-channel bonding such that the computing system 400 may perform or direct the performance of the operations associated therewith as directed by the instructions. In these and other embodiments, the instructions may be used to perform the method 200 of FIG. 2, and/or the method 300 of FIG. 3.

The memory 404 and the data storage 406 may include computer-readable storage media or one or more computer-readable storage mediums for carrying or having computer-executable instructions or data structures stored thereon. Such computer-readable storage media may be any available media that may be accessed by a computer, such as the processor 402.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a computer. Combinations of the above may also be included within the scope of computer-readable storage media.

Computer-executable instructions may include, for example, instructions and data configured to cause the processor 402 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

The communication unit 408 may include any component, device, system, or combination thereof that is configured to transmit or receive information over a network. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna implementing 4G (LTE), 4.5G (LTE-A), and/or 5G (mmWave) telecommunications), and/or chipset (such as a Bluetooth® device (e.g., Bluetooth 5 (Bluetooth Low Energy)), an 802.6 device (e.g., Metropolitan Area Network (MAN)), a Wi-Fi device (e.g., IEEE 802.11ax, a WiMAX device, cellular communication facilities, etc.), and/or the like. The communication unit 408 may permit data to be exchanged with a network and/or any other devices or systems described in the present disclosure.

Modifications, additions, or omissions may be made to the computing system 400 without departing from the scope of the present disclosure. For example, in some embodiments, the computing system 400 may include any number of other components that may not be explicitly illustrated or described. Further, depending on certain implementations, the computing system 400 may not include one or more of the components illustrated and described.

As indicated above, the embodiments described herein may include the use of a computing system (e.g., the processor 402 of FIG. 4) including various computer hardware or software modules. Further, as indicated above, embodiments described herein may be implemented using computer-readable media (e.g., the memory 404 of FIG. 4) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where α convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

obtaining anomaly characteristics associated with an anomaly in a transmission medium in an optical transmission system, where the anomaly causes a degradation in one or more signal characteristics of an optical signal traversing the transmission medium, the anomaly characteristics including an anomaly location of the anomaly within the transmission medium;

selecting, from a plurality of optical adjustment options and based on the anomaly location, an optical amplification adjustment corresponding to the transmission medium, the plurality of optical adjustment options including:

a first adjustment option that includes using, for the optical amplification adjustment, a first optical amplifier disposed at an input end of the transmission medium and excludes using, for the optical amplification adjustment, a second optical amplifier disposed at an output end of the transmission medium;

a second adjustment option that includes using, for the optical amplification adjustment, the second optical amplifier and excludes using, for the optical amplification adjustment, the first optical amplifier; and a third adjustment option that includes using the first optical amplifier and the second optical amplifier for the optical amplification adjustment; and based on the anomaly characteristics and the selected optical amplification adjustment, performing at least one of:

adjusting a first output power of a first optical amplifier disposed at an input end of the transmission medium; or adjusting a second output power of a second optical amplifier disposed at an output end of the transmission medium.

2. The method of claim 1, wherein:

adjusting the first output power comprises adjusting a first pumping power associated with the first optical amplifier; and adjusting the second output power comprises adjusting a second pumping power associated with the second optical amplifier.

3. The method of claim 1, wherein adjusting the first output power comprises adjusting a first input power associated with a first wavelength of the optical signal and adjusting a second input power associated with a second wavelength of the optical signal.

4. The method of claim 1, wherein:

the anomaly characteristics further include an anomaly loss amount, and the one or more signal characteristics include at least one of: a signal-to-noise ratio, an error vector magnitude, and a pre-forward-error correction coding bit error rate.

5. The method of claim 4, wherein adjusting the first output power and adjusting the second output power are based on the anomaly loss amount, the anomaly location, and a transmission medium loss coefficient associated with the transmission medium.

6. The method of claim 4, wherein, in response to the anomaly location being less than a threshold distance from the input end of the transmission medium, the selected optical amplification adjustment includes the third adjustment option and the second output power is adjusted after adjusting the first output power.

7. The method of claim 6, wherein the threshold distance is based on an effective transmission medium length of the transmission medium.

8. The method of claim 7, wherein the effective transmission medium length is determined using a transmission medium length of the transmission medium and a factor associated with a transmission medium loss coefficient of the transmission medium.

9. The method of claim 4, wherein in response to the anomaly location being greater than a threshold distance from the input end of the transmission medium, the selected optical amplification adjustment includes the second adjustment option.

10. The method of claim 1, wherein:

the first optical amplifier is an erbium doped optical amplifier, a forward Raman amplifier, or a combination of erbium doped optical amplifier and forward Raman amplifier; and the second optical amplifier is a backward Raman amplifier.

11. A system comprising:

one or more computer-readable storage media configured to store instructions; and one or more processors communicatively coupled to the one or more computer-readable storage media and configured to, in response to execution of the instructions, cause the system to perform operations, the operations comprising:

obtaining anomaly characteristics associated with an anomaly in a transmission medium in an optical transmission system, where the anomaly causes a degradation in one or more signal characteristics of an optical signal traversing the transmission medium, the anomaly characteristics including an anomaly location of the anomaly within the transmission medium;

selecting, from a plurality of optical adjustment options and based on the anomaly location, an optical amplification adjustment corresponding to the transmission medium, the plurality of optical adjustment options including:

a first adjustment option that includes using, for the optical amplification adjustment, a first optical amplifier disposed at an input end of the transmission medium and excludes using, for the optical amplification adjustment, a second optical amplifier disposed at an output end of the transmission medium;

a second adjustment option that includes using, for the optical amplification adjustment, the second optical amplifier and excludes using, for the optical amplification adjustment, the first optical amplifier; and a third adjustment option that includes using the first optical amplifier and the second optical amplifier for the optical amplification adjustment; and based on the anomaly characteristics and the selected optical amplification adjustment, performing at least one of:

adjusting a first output power of a first optical amplifier disposed at an input end of the transmission medium; or adjusting a second output power of a second optical amplifier disposed at an output end of the transmission medium.

12. The system of claim 11, wherein:

adjusting the first output power comprises adjusting a first pumping power associated with the first optical amplifier; and adjusting the second output power comprises adjusting a second pumping power associated with the second optical amplifier.

13. The system of claim 11, wherein adjusting the first output power comprises adjusting a first input power associated with a first wavelength of the optical signal and adjusting a second input power associated with a second wavelength of the optical signal.

14. The system of claim 11, wherein:

the anomaly characteristics further include an anomaly loss amount, and the one or more signal characteristics include at least one of: a signal-to-noise ratio, an error vector magnitude, and a pre-forward-error correction coding bit error rate.

15. The system of claim 14, wherein adjusting the first output power and adjusting the second output power are based on the anomaly loss amount, the anomaly location, and a transmission medium loss coefficient associated with the transmission medium.

16. The system of claim 14, wherein in response to the anomaly location being less than a threshold distance from the input end of the transmission medium, the operations include adjusting the first output power and adjusting the second output power, wherein the second output power is adjusted after adjusting the first output power.

17. The system of claim 16, wherein the threshold distance is based on an effective transmission medium length of the transmission medium.

18. The system of claim 17, wherein the effective transmission medium length is determined using a transmission medium length of the transmission medium and a factor associated with a transmission medium loss coefficient of the transmission medium.

19. The system of claim 14, wherein in response to the anomaly location being greater than a threshold distance from the input end of the transmission medium, the operations further comprise adjusting the second output power.

20. The system of claim 11, wherein the optical transmission system includes a plurality of optical spans and in response to the anomaly characteristics indicating the anomaly is disposed in a first optical span of the plurality of optical spans in the optical transmission system, only the first output power of the first optical amplifier and/or the second output power of the second optical amplifier in the first optical span are adjusted such that no adjustment of output powers of optical amplifiers in other optical spans of the plurality of optical spans occurs in response to the anomaly.

* * * * *